(12) United States Patent
Ieda

(10) Patent No.: US 6,868,841 B2
(45) Date of Patent: Mar. 22, 2005

(54) DEFLECTOR BY-PASS VALVE FOR GAS FROM THE ENGINE

(75) Inventor: João José Cardinali Ieda, Vila Independencia (BR)

(73) Assignee: Wahler Metalurgica Ltda, Sao Paulo (BR)

( * ) Notice: Subject to any disclaimer, the term of this patent is extended or adjusted under 35 U.S.C. 154(b) by 0 days.

(21) Appl. No.: 10/788,681

(22) Filed: Feb. 27, 2004

(65) Prior Publication Data
US 2004/0187487 A1 Sep. 30, 2004

(30) Foreign Application Priority Data
Feb. 27, 2003 (BR) .............................................. 0300427

(51) Int. Cl.⁷ .............................................. F02M 25/07
(52) U.S. Cl. .............................. 123/568.12; 123/568.31
(58) Field of Search ....................... 123/568.11, 568.12, 123/568.25, 568.26, 568.27, 568.28, 568.29, 568.3, 568.31, 568.32; 60/324

(56) References Cited

U.S. PATENT DOCUMENTS

| | | | | |
|---|---|---|---|---|
| 5,305,720 A | * | 4/1994 | Ando et al. ............ | 123/568.24 |
| 5,531,205 A | * | 7/1996 | Cook et al. ............. | 123/568.24 |
| 5,732,688 A | * | 3/1998 | Charlton et al. ........ | 123/568.12 |
| 5,740,785 A | * | 4/1998 | Dickey et al. ......... | 123/568.12 |
| 6,062,205 A | * | 5/2000 | Bevan et al. .......... | 123/568.24 |
| 6,135,415 A | * | 10/2000 | Kloda et al. ........... | 123/568.24 |
| 6,575,149 B2 | * | 6/2003 | Gagnon ................. | 123/568.24 |
| 6,681,799 B2 | * | 1/2004 | Gagnon ................. | 123/568.24 |

* cited by examiner

Primary Examiner—Willis R. Wolfe, Jr.
(74) Attorney, Agent, or Firm—William J. Sapone; Coleman Sudol Sapone P.C.

(57) ABSTRACT

A deflector by-pass valve for engine exhaust gas, used with an exhaust gas recirculation system on an automobile, is integrated with the cooling system, and located before the inlet for the engine's hot gas to the water/gas heat exchanger of the EGR system. The deflector by-pass valve is activated by a vacuum/pressure pneumatic system and actuated by an electric signal from the engine's electronic control center. Its main purpose is to conduct the gas through the heat exchanger/gas cooler when cooling is required, or to recycle the gas directly to the engine, without it passing through the heat exchanger when the gas is below the minimum limit for cooling.

7 Claims, 5 Drawing Sheets

DEFLECTOR BY-PASS VALVE FOR GAS FROM THE ENGINE

TECHNICAL FIELD

This invention is directed to a deflector by-pass valve for engine exhaust gas, for use in the automobile industry.

BACKGROUND

This invention a deflector by-pass valve for engine exhaust gas, for use in the automobile industry, and more particularly, for integration with the engine cooling system before the inlet of the engine's hot gas to the water/gas heat exchanger used with an exhaust gas recirculation (EGR) system.

The deflector by-pass valve is activated by a vacuum or pressure pneumatic system, and actuated by an electric signal from the engine's electronic center and control. The main purpose is to conduct the gas through the heat exchanger /gas cooler when cooling is required, or to deflect the gas and thereby recycle the gas directly from the engine, without it passing through the heat exchanger when the gas is below the minimum limits for cooling. This brings a series of practical, functional and efficient technical advantages, among which the following stand out: 1) ensure gas recycling at an adequate temperature; 2) improve and secure the best performance of the internal combustion engine as regards combustion, specific power, specific consumption, transience of operation and control of the emission of pollutants; 3) reduction of gas condensation and consequently, reduction of non-operation of components and accessories of the control system for pollutant emission due to soot, oil and water deposits, and other residues from combustion on walls of equipment, heat exchanger, ducts and EGR valve, inlet manifold, nipples and other components.

To understand the invention, reference is made to the attached illustrative drawings, which should be referenced for a better understanding of the detailed description below.

DETAILED DESCRIPTION OF THE INVENTION

Figure 1:
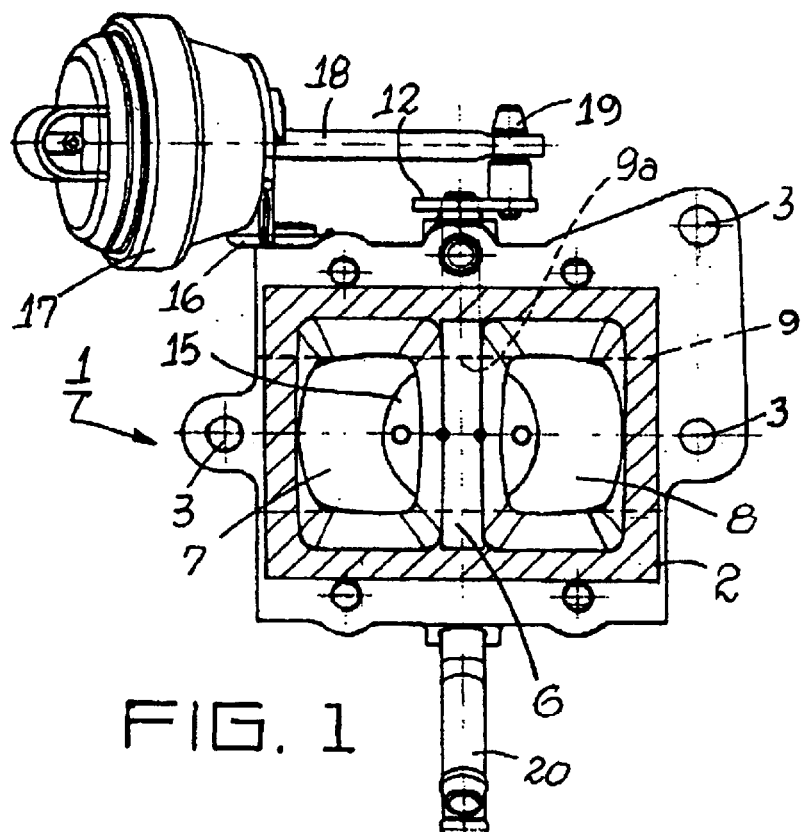
FIG. 1 shows a lower view of the deflector by-pass valve for gas from the engine.
Figure 2:
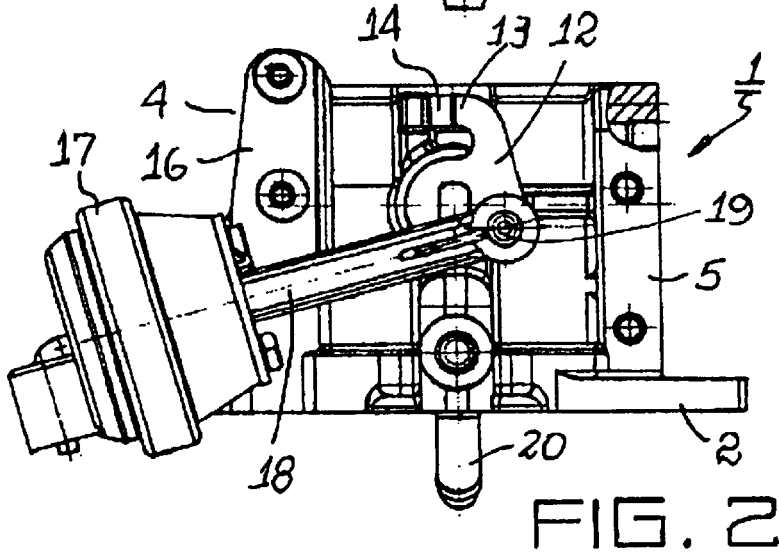
FIG. 2 shows a front view thereof.
Figure 3:
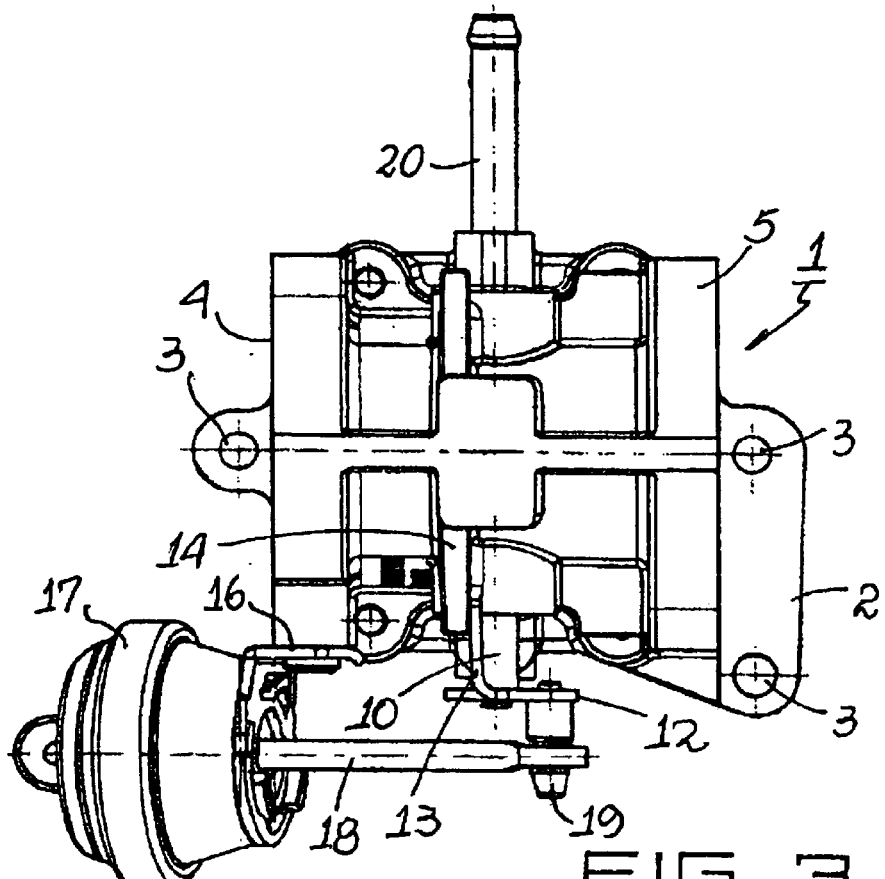
FIG. 3 shows a top view thereof.
Figure 4:
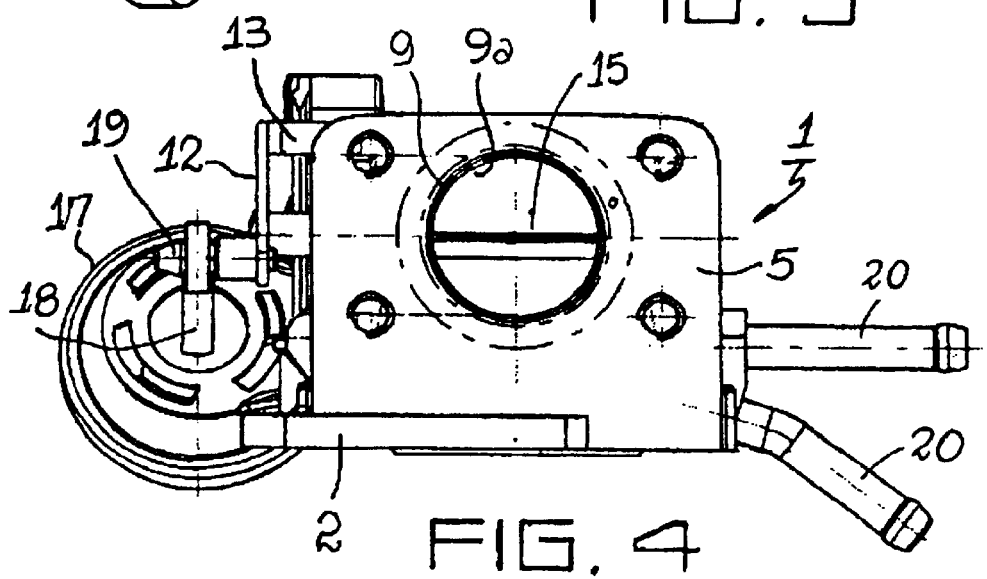
FIG. 4 shows a right-hand side view thereof (according to the position represented in the drawings)
Figure 5:
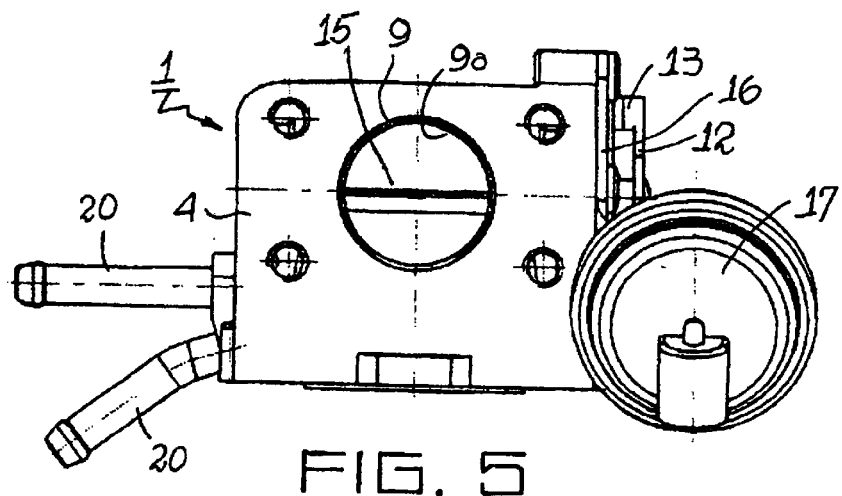
FIG. 5 shows a left-hand side view thereof.

Referring the FIG. 1, the deflector by-pass valve for engine exhaust gas has a multiform block (1) with a flange (2) equipped with conveniently located holes (3) for passage of fastening bolts, with two side walls (4) and (5), shown in FIG. 2, located perpendicularly to the flange (2), also equipped with holes for coupling bolts. An intermediary wall (6) divides an interior thereof into two adjacent compartments (7) and (8), open at the flange (2) and interconnected by a circular opening (9a) on the intermediary wall (6), where the valve mechanism and the interface with the heat exchanger are housed.

Figure 6:
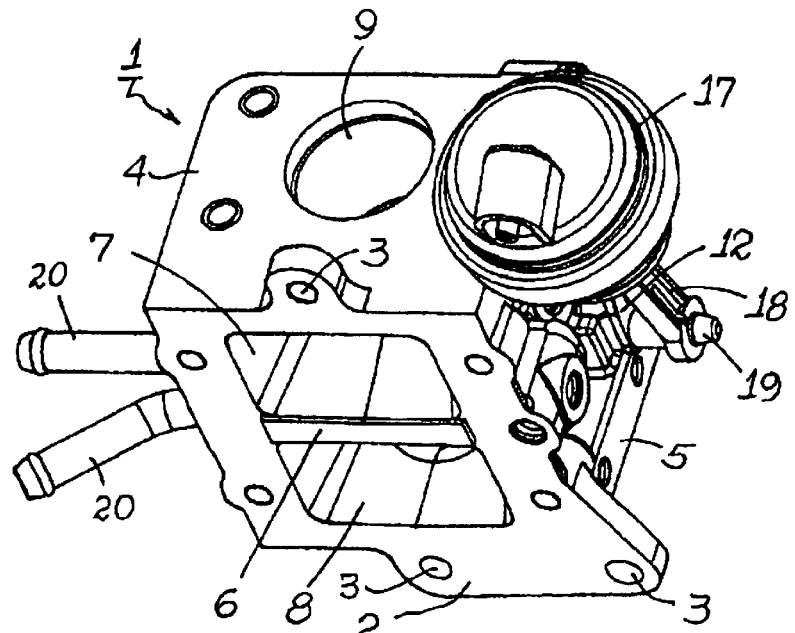
FIG. 6 shows a three-dimensional view thereof.

The circular opening (9a) of the intermediary wall (6) is positioned in alignment with openings (9), best seen in FIGS. 6 and 7, on the two side walls (4) and (5), defining the passages of the gas from the engine which, if it needs to be cooled, being conducted towards the gas/water heat exchanger of the EGR system and, if its temperature is below the minimum limits for cooling, the gas is recycled directly to the engine without passing through the heat exchanger.

Figure 7:
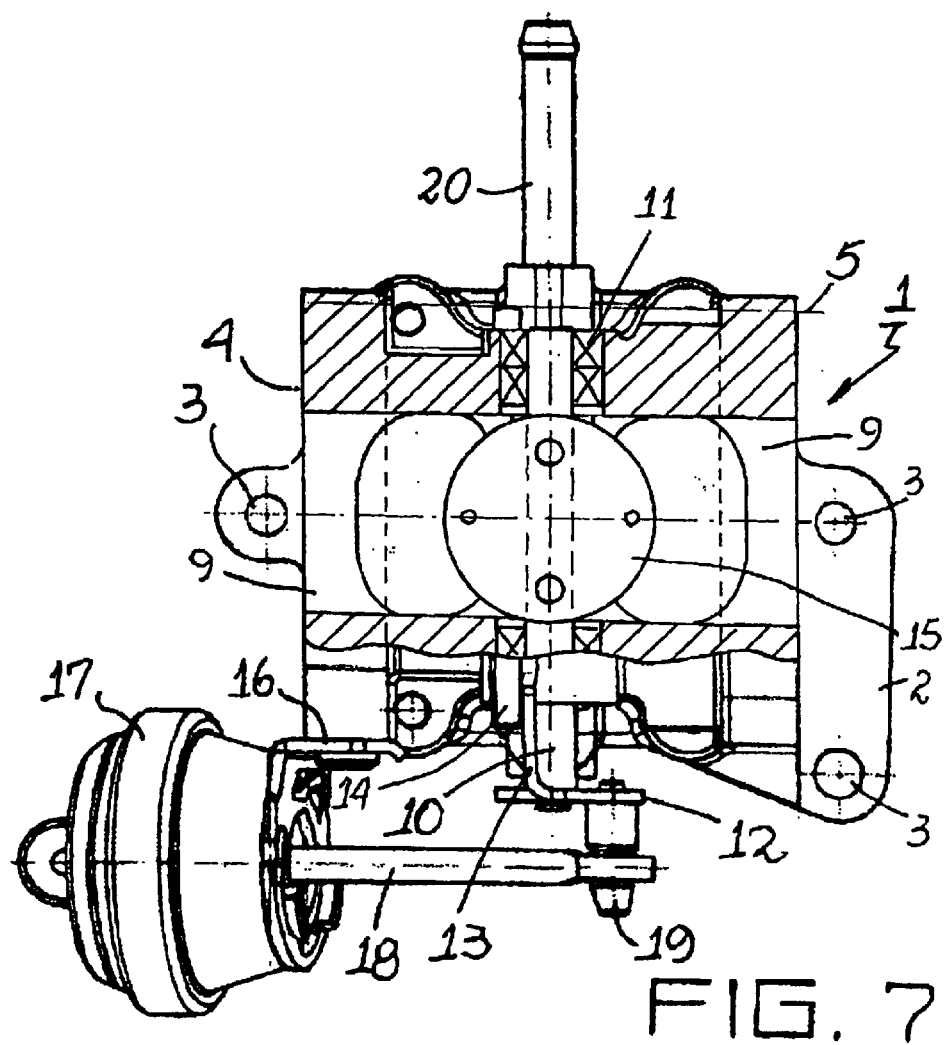
FIG. 7 shows a top view with partial section thereof.
Figure 8:
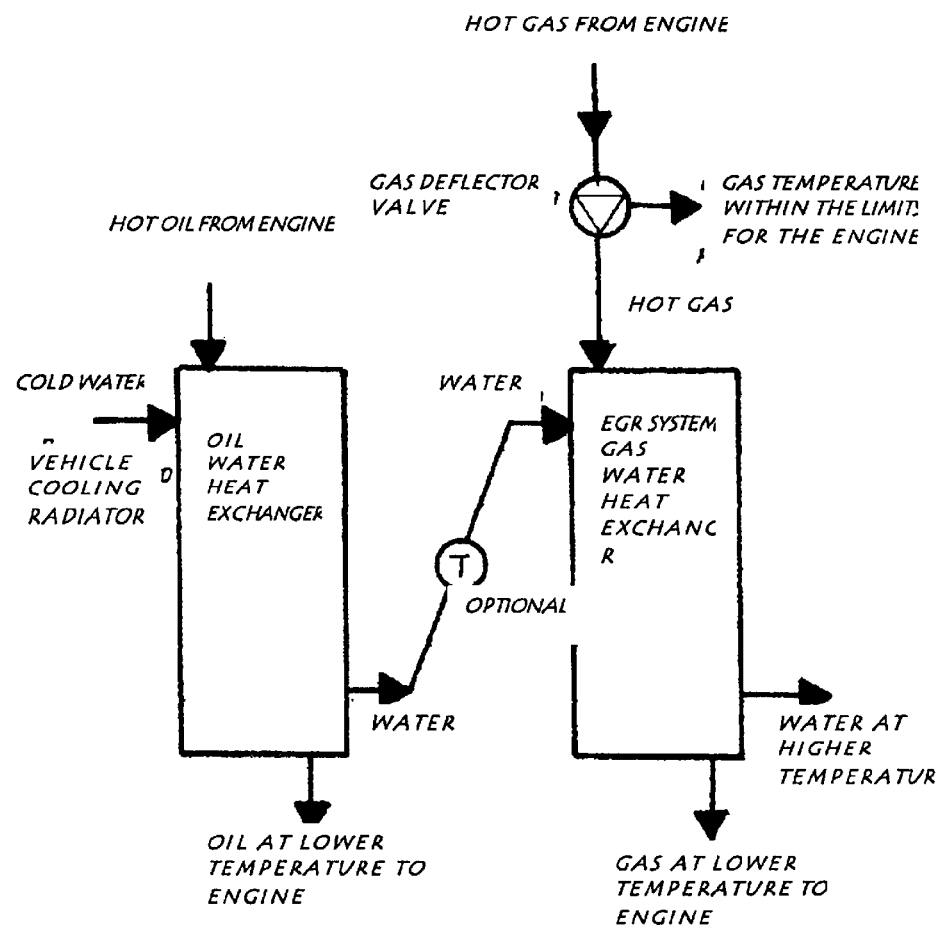
FIG. 8 shows a schematic diagram of the engine exhaust gas and cooling system.

The opening (9a) in the intermediary wall (6) has two through holes positioned in diametrically opposite directions along the part's width, to which roller bearings or bushings (11), shown in FIG. 7, are assembled for installation of a crossover shaft (10), which penetrates the hole on one side and comes out through the side of the block. The end of this shaft (10) is connected to a plate (12) equipped with a perpendicular pawl (13), which acts as a limiter of rotary motion of the shaft (10), with angular definition of this plate (12) stopped on contacting a shoulder (14) cast in the block's body.

In the interior of the opening (9a) of the intermediary wall (6) and riveted to the shaft (10), there is an element for blocking/releasing the gas passage, defined by a "butterfly" valve (15).

On one of the side walls (4), a support (16) is fixed for the vacuum/pressure pneumatic valve (17), to which an axial rod (18) is connected, extending up to the plate (12), where its end is articulated to an eccentric point (19) in relation to the point of connection of the shaft (10), and therefore, this rod (18) works as a connecting rod, converting the rectilinear motion of the this shaft (10) into a circular motion, consequently for rotating the "butterfly" valve (15).

Two ducts (20) are incorporated in the block (1), one for admission and one for return of the valve mechanism's liquid coolant.

The gas from the engine can enter from one or another end of the block (1) through the hole made on the sidewall, and flow through the inner compartments. If the gas is at a temperature above the selected limits, it must be cooled. The "butterfly" valve (15) is therefore closed by a command from the vacuum/pressure pneumatic actuator (17), which is actuated by an electric signal from the engine's electronic control center, and the gas is directed to the heat exchanger of the EGR system. If the gas temperature is below the minimum limits and does not require cooling, the "butterfly" valve (15) is opened, also by a command from the vacuum/pressure pneumatic actuator (17), and the gas is recycled directly to the engine without passing through the heat exchanger.

Therefore, the inventive deflector by-pass valve for engine exhaust gas fully satisfies the proposed objectives, performing the functions for which it was designed in a practical and efficient manner, providing a series of advantages that are inherent to its applicability, and giving it unique and innovative features possessing the fundamental requirements for novelty.

What is claimed is:

1. A deflector by-pass valve for engine exhaust gas for use with an exhaust gas recirculation system comprising a multiform block (1) having a flange (2), two side walls (4) and (5) disposed perpendicularly to the flange (2), an intermediary wall (6) disposed within an interior of the block for dividing the interior into two adjacent compartments (7) and (8), open at the flange and interconnected by a circular opening (9a) in the intermediary wall (6), the circular opening (9a) of the intermediary wall(6) positioned in alignment with the openings (9) on the two side walls (4) and (5) which define gas passages for receiving the exhaust gas from the engine; the opening (9a) on the central wall providing two through holes positioned in diametrically opposite directions along a width of the body, for receiving bearing means (11), a crossover shaft (10) located in the opening (9a) and rotationally supported by the bearing means, an end of the shaft (10) connected to a plate (12) equipped with a perpendicular pawl (13), which acts as a limiter of the rotary motion through engagement of the plate (12) on a shoulder (14) located on the block; valve means fixed to the shaft (10) for blocking/releasing the gas passage in correspondence to the rotation of the shaft, the body having a support (16) for an actuator (17), to which an axial rod (18) is connected, extending up to the plate (12), having an end articulated to an eccentric point (19) in relation to a point of connection of the shaft (10), the rod (18) converting rectilinear motion of the shaft (10) into a circular motion for moving the valve means, the body having two ducts (20), one for admission and one for return of a liquid coolant for cooling the valve means.

2. The deflector by-pass valve of claim 1 wherein the flange has holes for receiving mounting bolts therein.

3. The deflector by-pass valve of claim 1 wherein the side walls have holes for receiving mounting bolts therein.

4. The deflector by-pass valve of claim 1 wherein the bearing means comprise roller bearings or bushings.

5. The deflector by-pass valve of claim 1 wherein the valve means is a butterfly valve.

6. The deflector by-pass valve of claim 1 wherein the actuator is a vacuum/pressure pneumatic actuator.

7. The deflector by-pass valve of claim 1 further comprising control means for controlling a position of the valve means responsive to exhaust gas temperature.

\* \* \* \* \*